(12) United States Patent
Dowdell et al.

(10) Patent No.: US 11,952,209 B2
(45) Date of Patent: Apr. 9, 2024

(54) 3 IN 1 REVERSE VENDING MACHINE

(71) Applicants: Kareem Casadyrell Dowdell, Albany, NY (US); Shirley Robena Baker, Albany, NY (US); Roosevelt Dowdell, Jr., Albany, NY (US)

(72) Inventors: Kareem Casadyrell Dowdell, Albany, NY (US); Shirley Robena Baker, Albany, NY (US); Roosevelt Dowdell, Jr., Albany, NY (US)

( * ) Notice: Subject to any disclaimer, the term of this patent is extended or adjusted under 35 U.S.C. 154(b) by 415 days.

(21) Appl. No.: 16/974,339

(22) Filed: Dec. 31, 2020

(65) Prior Publication Data
US 2021/0221606 A1   Jul. 22, 2021

Related U.S. Application Data

(60) Provisional application No. 62/919,865, filed on Apr. 2, 2020.

(51) Int. Cl.
| | |
|---|---|
| *B02C 18/06* | (2006.01) |
| *B02C 18/00* | (2006.01) |
| *B65F 1/00* | (2006.01) |
| *B65F 1/14* | (2006.01) |
| *G07F 7/06* | (2006.01) |

(52) U.S. Cl.
CPC .......... *B65F 1/006* (2013.01); *B02C 18/0084* (2013.01); *B02C 18/06* (2013.01); *B65F 1/1431* (2013.01); *G07F 7/0609* (2013.01); *B02C 2201/06* (2013.01); *B65F 2210/1023* (2013.01); *B65F 2210/1123* (2013.01); *B65F 2210/1125* (2013.01); *B65F 2210/116* (2013.01); *B65F 2210/138* (2013.01); *B65F 2210/168* (2013.01); *B65F 2210/169* (2013.01); *B65F 2210/172* (2013.01); *B65F 2210/176* (2013.01); *B65F 2240/1123* (2013.01); *B65F 2240/1126* (2013.01)

(58) Field of Classification Search
CPC ................ B65F 1/1431; B65F 1/006; B65F 2210/1123; B65F 2210/12; B65F 2210/138; B65F 2210/169; B65F 2210/172; B65F 2210/176; G07F 7/0609; B02C 18/0084; B02C 18/06; B07C 5/126
See application file for complete search history.

(56) References Cited

U.S. PATENT DOCUMENTS

| | | | | |
|---|---|---|---|---|
| 4,285,426 A | * | 8/1981 | Cahill | G07F 7/0609 100/902 |
| 4,463,844 A | * | 8/1984 | Huffman | G07F 7/0609 100/902 |
| 4,573,641 A | * | 3/1986 | DeWoolfson | B02C 19/0087 241/36 |

(Continued)

*Primary Examiner* — Joseph C Rodriguez

(57) ABSTRACT

A 3 in 1 reverse vending machine. A vending machine that is solar powered and accepts bottles and cans made of plastic, aluminum, and glass. The machine includes a conveyor system, barcode reader and cleaning system, this prepares the bottle and cans to be shredded and then granulated into small pieces. The machine houses a delivery system that carries the smaller pieces of processed material to its predetermined receptacle for storage. Each bottle and can has a monetary value once received by the machine that will be issued to the user once all bottles and cans are received and calculated per user per transaction.

3 Claims, 7 Drawing Sheets

(56) References Cited

U.S. PATENT DOCUMENTS

| | | | | |
|---|---|---|---|---|
| 4,782,251 | A * | 11/1988 | Tsugaru | H03K 19/017527 |
| | | | | 326/66 |
| 5,257,741 | A * | 11/1993 | Rode | G07F 7/0609 |
| | | | | 241/DIG. 38 |
| 5,432,545 | A * | 7/1995 | Connolly | B07C 5/361 |
| | | | | 209/939 |
| 5,465,822 | A * | 11/1995 | DeWoolfson | G07F 7/0609 |
| | | | | 406/3 |
| 5,894,939 | A * | 4/1999 | Frankel | G01N 21/21 |
| | | | | 356/240.1 |
| 8,718,818 | B2 * | 5/2014 | Nordbryhn | G07F 7/0609 |
| | | | | 700/240 |
| 8,851,265 | B2 * | 10/2014 | Morishita | B28B 3/02 |
| | | | | 194/208 |
| 10,210,693 | B2 * | 2/2019 | Hannawa | B30B 9/321 |
| 2012/0173014 | A1 * | 7/2012 | Morishita | B28B 3/02 |
| | | | | 700/223 |
| 2019/0017863 | A1 * | 1/2019 | Saltzman | B65G 69/14 |
| 2023/0311167 | A1 * | 10/2023 | Ahmad | B02C 18/0092 |
| | | | | 241/24.28 |

* cited by examiner

3 IN 1 REVERSE VENDING MACHINE

FIELD

A vending machine where people can bring empty beverage bottles and cans, plastic, aluminum, glass and deposit them into the machine to be collected and stored. For collecting and bring the empty beverage bottles and cans to the machine people who participate I.e., the user is rewarded a monetary value for each bottle or can deposited. Once deposited bottles and cans are collected to the machine's capacity, the bottles and cans then await pick up to be recycled.

BACKGROUND

The present application describes a 3 in 1 reverse vending machine that relates to past and current recycling vending machines, being those of single material receiving recycling vending machines and multiple material receiving vending machines are all machines that are used in reverse vending. A reverse vending machine is a device that accepts used (empty) beverage containers and returns money to the user. The recycler places the empty bottle or can into the receiving aperture that allows the user to insert containers one at a time. (An alternative system, found in many older machines, is one in which the user opens a door by hand and places the empty container in a pan. When the door is released and closed, the process continues. The average reverse vending machine in use in today's market does not have the capabilities to make recycling through vending cost effective enough to compete with the rate of bottle waste.

Around the world there are emergency efforts to combat bottle and can waste from the world's water supplies, land, and sewers systems. This emergence has brought forth a new effort to make waste cleanup and recycling a major priority. Giving an anew value to bottles and cans redeemable at a determined set value.

SUMMARY

The invention a 3 in 1 reverse vending machine with the receiving and recycling capabilities described in the present application, will provide an improved 3 in 1 reverse vending machine that has the capabilities to accept multiple redeemable plastic, aluminum and glass empty beverage bottles and cans to increase the rate of recycling. The machine system method described in the present application allows the machine to collect, clean, scan, count, sort, shred, granulate, deliver, and store deposited bottles and cans based on the bottle or cans material makeup and color, which is identified on the bottle or cans barcode and read by the machines UPC scanner and color sensor.

The disclosed exemplary embodiments provide a machine in which all the components increase the processes of recycling. In the 1$^{st}$ example the front face of the machine is enclosed in a transparent housing. In the 2$^{nd}$ example the front face of the machine discloses the exemplary methods of recycling specific to the author's invention. In the 3$^{rd}$ example the front face of the machine discloses the exemplary method of power and connecting properties. In the 4$^{th}$ example the front face of the machine discloses the back of the machine. In the 5$^{th}$ example the front face of the device comprises of one exemplary method used in the recycling process. In the 6$^{th}$ example the front face of the device comprises of another exemplary method used in the recycling process. In the 7$^{th}$ example the front face of the device comprises of one exemplary method used in the delivery of material in the recycling process.

Further objects, features, advantages and properties of the machine according to the present application will become apparent from the detailed descriptions.

BRIEF DESCRIPTION OF THE DRAWINGS

In the following detailed portion of the description, the teachings of the present application will be explained in more detail with reference to the example embodiments shown in the drawings, in which.

DETAILED DESCRIPTION

In the following detailed description, is the machine according to the teachings, for this application in the form of a 3 in 1 reverse vending machine. The machine system and its method of operation will be described by the embodiments of FIGS. 1 through 7 which comprise the machine and its components. It should be noted although only the recycling of bottles and cans i.e., plastic, aluminum, glass is described in the teachings, an application of the machine's technology can be used with many other less recycled items such as detergent bottles, card boards, Styrofoam and empty food containers.

Figure 1:
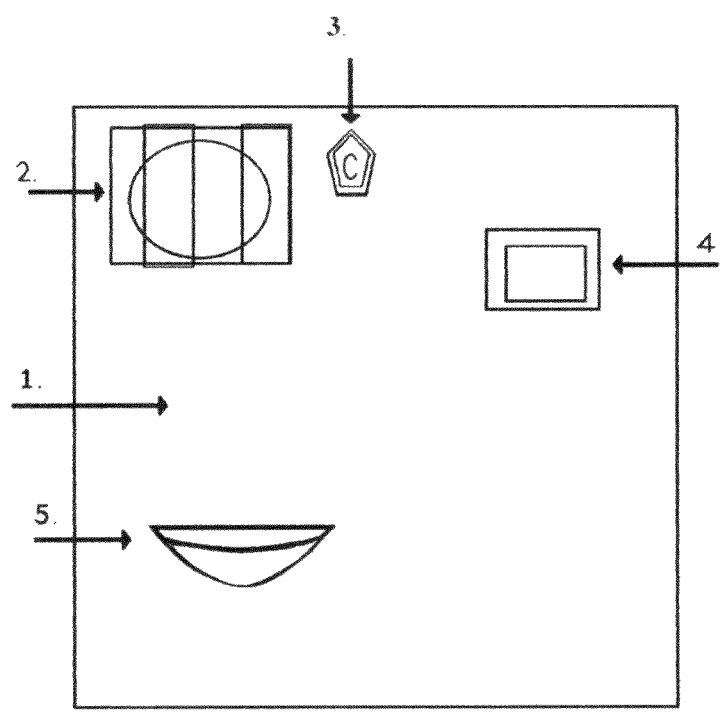
FIG. 1 A front view of the machine.

The first embodiment of the machine. FIG. 1. Is The plastic front cover of the machine. The front transparent plastic cover comprises a housing with a front face 1 The machines transparency will educate the user with a visual of the system and method in process and will thwart any destructive intentions that may lead to physical harm to the user. A Receptacle receiving hole with plastic protective cover 2 receives the deposited bottles and cans to be recycled while protecting the user from any backlash during the process. An occupancy sensor 3. The cash and coin distributor with counting screen 4 is for user interaction and allows the user to interact with the machine by keeping track of each transaction while viewing the recycling process. A receptacle feeding cone 5 allows the user to deposit 2 more than one bottle at a time into the receptacle receiving hole due to its cone like shape bottles and cans can be scoop, shoveled into or placed into the cones curved open structure and then lifted and attached to the front face of the machine FIG. 1 Infront of the receptacle receiving to be automatically deposited by the machine's conveyor 10.

Figure 2:
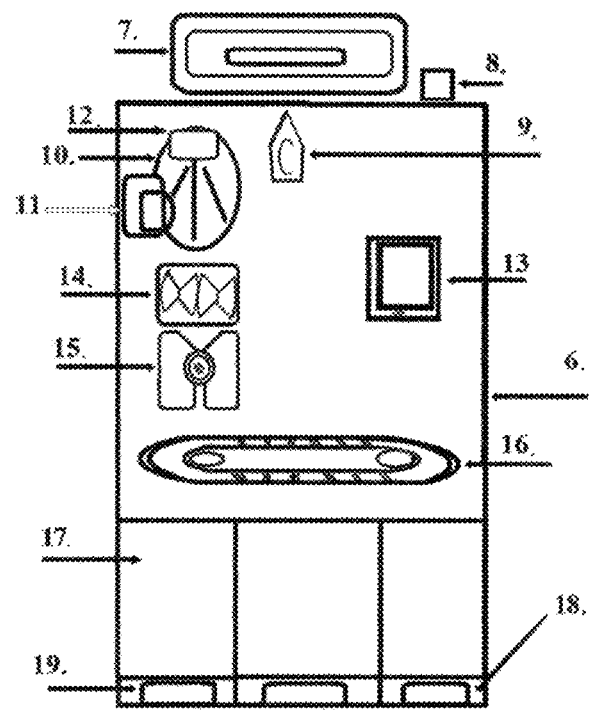
FIG. 2 A inside view of the machine with components.

The second embodiment of the machine is illustrated in FIG. 2. Comprises of the inside of the machine 6 illustrating the housing of one or more solar panels 7 as the sun being the machine primary energy source thus allowing the machine to be placed outdoors not having to rely on an electrical outlet for power. An alarm 8 that sirens to thwart any mishandling of the machine. An occupancy sensor with camera 9 activates the machine to power on by detecting the motion of a user while recording the transaction. A Receptacle intake with conveyor 10 to receive the recyclables and convey them to be processed. A Universal Product Code (UPC) scanner 11 scans the recyclable as it is conveyed during the recycling process to identify to the machine the material collected and the process needed, also to notify the user that their redeemable has been counted, to notify the beverage company that their recyclable has been collected and to notify the machines manufacturer to keep track of each transaction. A color detector sensor 12 is required to detect the color of each recyclable to determine proper storage. A coin and cash calculating computerized distributor 13 to record and calculate each transaction for a total once the user is done entering the recyclables he or she has collected i.e., redeemable monies or reward for collecting what is considered waste. A shredder 14 to shred the recyclable collected to shrink its size and make it more manageable during the process. A granulator 15 to make the recycled material even smaller and even more manageable for cleaning and storage purposes. A delivery apparatus 16 to deliver the recycled material to its proper receptacle for storage and further process. Recycled materials receptacles 17 to store each processed recyclable based on its material 11 and color 12. One or more materials waste screens 18 to screen any unwanted waste from the recycled materials collected. One or more Liquid waste sponges 19 to further screen out unwanted waste and recycle the cleaning solution used during the cleaning process.

Figure 3:
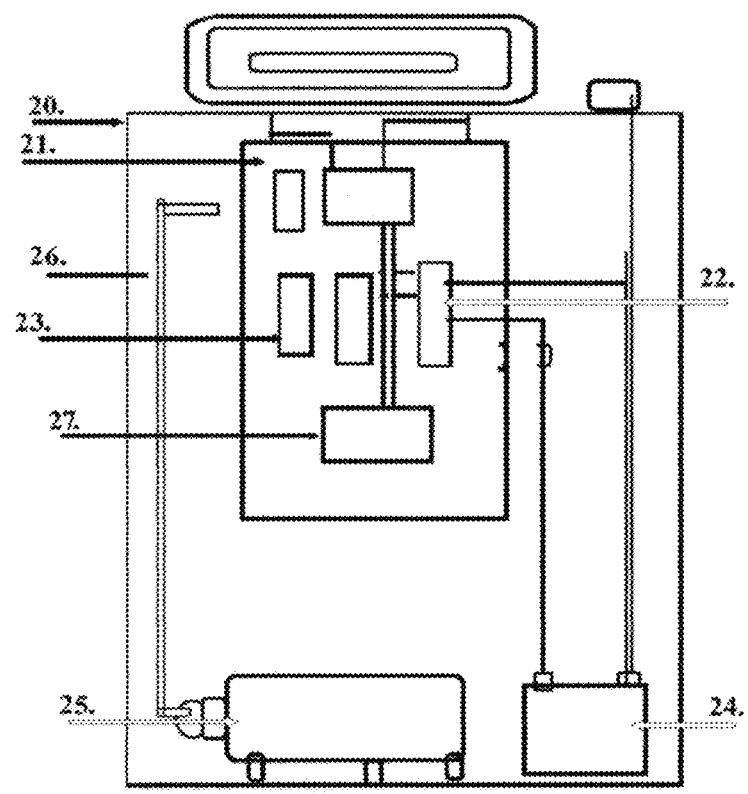
FIG. 3 A back inside view of the machines power and cleaning systems.

The third embodiment of the machine is illustrated in FIG. 3. Comprises of the back inside of the machine 20. Illustrating the housing of a circuit control board 21 to distribute power to the different components of the machine. A power Inverter 22 to convert the primary energy source from one or more solar panels 7. A voltage regulator 23 to regulate the voltage operating throughout the machine. A deep cycle battery 24 to store and use the power collected when signaled to do so 9. A cleaning solution pump 25 to pump cleaning solution throughout the machine during the recycling process. A cleaning solutions sprayer 26 to spray the cleaning solution throughout the machine during the recycling process. A power reserve 27 to reserve increments of power to preserve energy to be used when needed.

Figure 4:
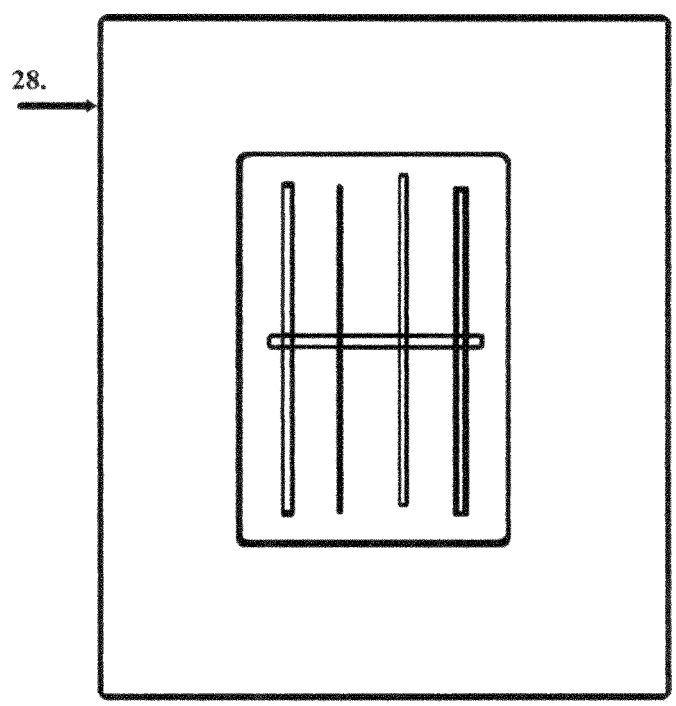
FIG. 4 A view of the back cover of the machine.

The fourth embodiment of the machine is illustrated in FIG. 4. Comprises of the back cover of the machine 28. Illustrating the back of said machine.

Figure 5:
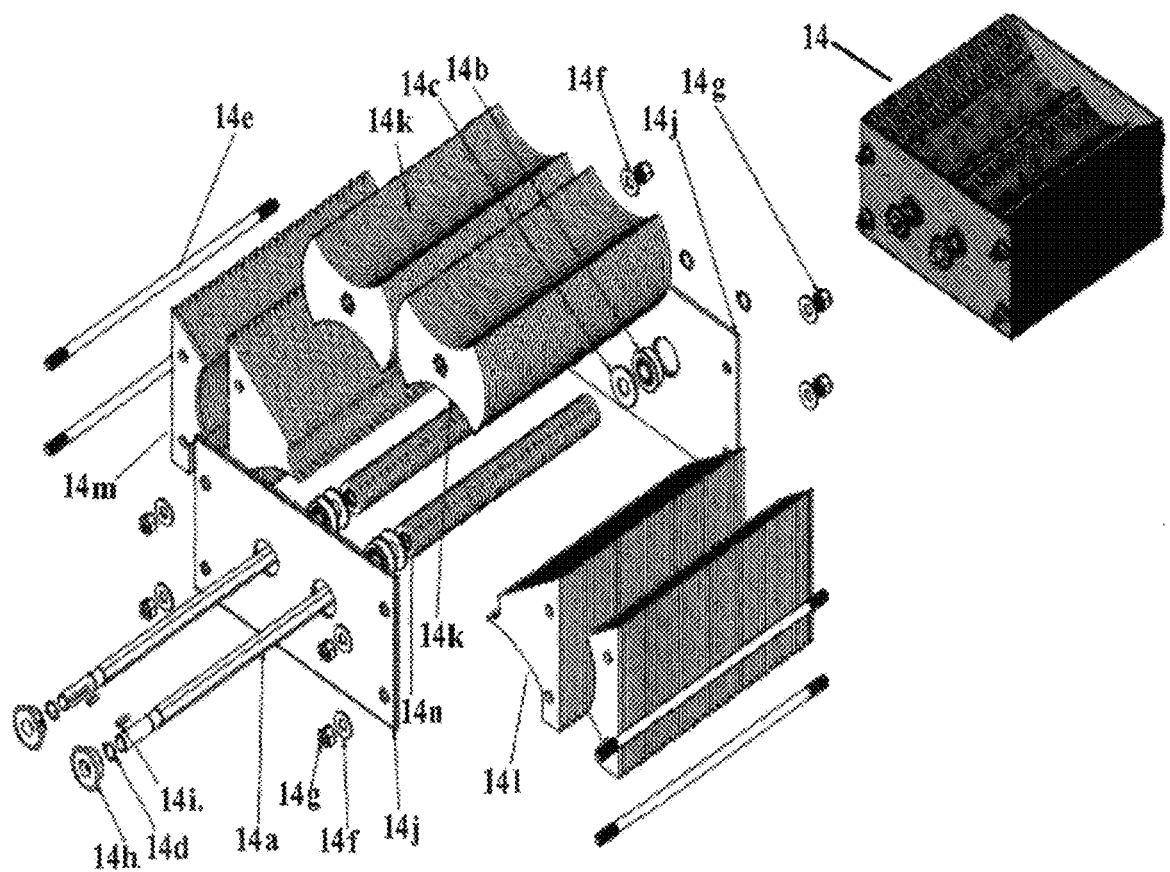
FIG. 5 A schematic diagram of the shredder apparatus of the Machine.

The fifth embodiment of the machine is illustrated in FIG. 5. Comprises of the shredder of the machine 14. Illustrating the housing of 2 (Quantity), SHAFT, GRANULATOR 14a., 4 (Quantity) BALL BEARING, FLANGED 14b., 4 (Quantity) WASHER, ¾, SS 14c., 4 (Quantity) SNAP RING, ¾ SHAFT 14d., 2 (Quantity) CONNECTING ROD 14e., 4 (Quantity) WASHER, ½, SS 14f, 4 (Quantity) NYLOCK NUT, ½-13, BLACK OXIDE 14g., 2 (Quantity) Gears 14h., 2 (Quantity) KEY, 3/16×¾ 14i., 2 (Quantity) SHREDDER PLATE 14j., 56 (Quantity) SHREDDER BLADE, ROTATING 14k., 56 (Quantity) FIXED BLADE, SHREDDER, LARGE 14l., 60 (Quantity) FIXED BLADE, SHREDDER, SMALL 14m., 56 (Quantity) SPACER, SHREDDER STACKING 14n, allows the machine to shred the bottles and cans as they fall from the conveyor into the mouth of the shredder. The shredders' blade design 14k and method of cutting 14a, 14k,14l, 14m decreases the bottle or can movement, increasing the number of bottles and cans to be shredded during the shredding process.

Figure 6:
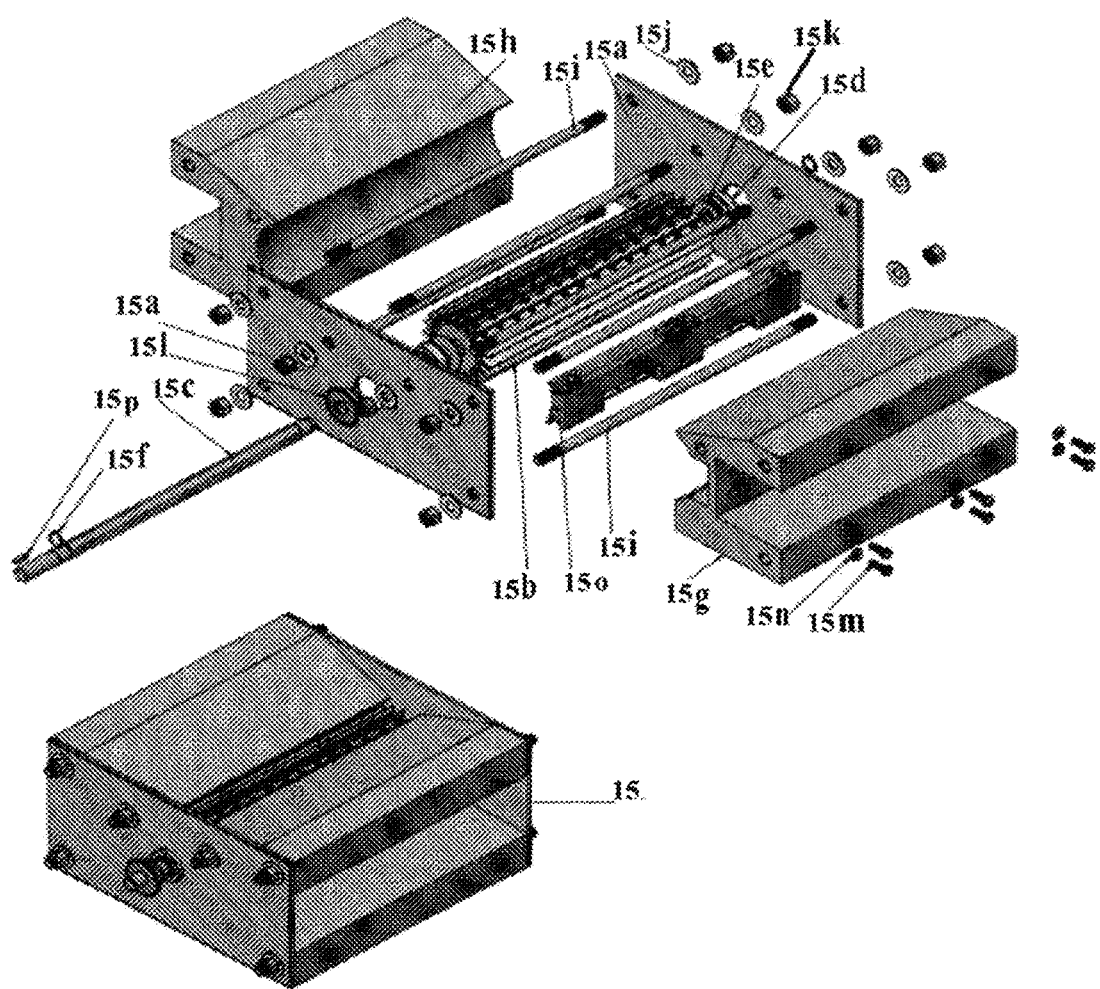
FIG. 6 A schematic diagram of the granulator apparatus of the Machine.

The sixth embodiment of the machine is illustrated in FIG. 6. Comprises of the granulator of the machine 15 the operation of the device granulates the recycled shredded material into smaller pieces. Illustrating the housing of 2 (Quantity) END PLATE 15a., 1 (Quantity) GRANULATOR BLADE, HOLDING 15b., 1 (Quantity) SHAFT, GRANULATOR 15c., 2 (Quantity) BALL BEARING, FLANGED 15d., 2 (Quantity) WASHER, ¾, SS 15e., 2 (Quantity) SNAP RING, ¾ SHAFT 15f, 1 (Quantity) RISER, FIXED BLADE 15g., 1 (Quantity) RISER, STANDARD 15h., 6 (Quantity) CONNECTING ROD 15i., 12 (Quantity) WASHER, ½, SS 15j., 12 (Quantity) NYLOCK NUT, ½-13, BLACK OXIDE 15k., 1 (Quantity) SPROCKET, ¾, 24 TOOTH 15l., 6 (Quantity) SCREW, ¼-20, HEX HEAD, SS 15m., 6 (Quantity) WASHER, ¼, SS 15n., 1 (Quantity) 3 GRANULATOR BLADE, FIXED 15o, 1 (Quantity) KEY, 3/16×¾ 15p.

Figure 7:
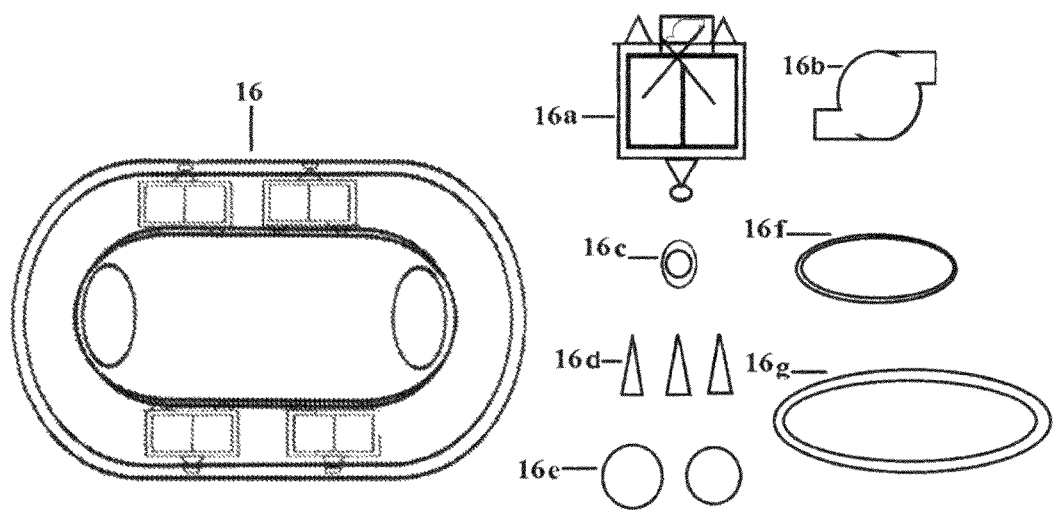
FIG. 7. A view of the machines delivery apparatus.

The seventh embodiment of the machine is illustrated in FIG. 7. Comprises of the delivery apparatus of the machine 16. Illustrating the housing which comprises of front view 16a to collect the recycled materials as they fall from the granulator housing 15. An opening drop mechanism with connecting rods 16b that allows the Hopper to close to catch the falling granulated material when prompted by the UPC scanner 11 and open to release the granulated material over its proper receptacle 17 when prompted 11. Connecting wheels 16c connects the Hopper to its housing 16g. Connecting pieces 16d connects the to the connecting wheels 16c. Rotating gears 16e turn the gear connecting chain 16f. Gear connecting chain 16f connects the Hopper 16a to the delivery apparatus holding rail 16g. delivery apparatus holding rail 16g connects the apparatus to the machine 6.

The machine described above will provide a new efficient and convenient way to recycle glass, plastic and aluminum bottles and cans. While being ran of solar energy the machines placement and transparency allows the user to watch and learn the recycling process on a level that is easy to comprehend and understand, also encouraging recycling while earning the user a monetary reward for every redeemable deposited into the machine. This will set forth a positive influence on others in the community to recycle while having a positive impact on the environment.

The various aspects of what is described can be used alone or in various combinations. It should be noted that the teaching in this application is not limited to the use in 3 in 1 reverse vending machines but can equally be well applied in a range of sorting, shredding, delivering and other material processing needs.

The Teaching of the present application has numerous advantages and different embodiments, or implementations may yield one or more of the following advantages. It should be noted that there are other advantages which are not described in the application. For example, the impact the machines applications have on the environment pertaining to vehicle emissions, since the machine cleans 25,26 shreds 14, and granulates 15 the redeemable received 2, this increases the amount of recycled material that can be carried by one truck meaning less trucks carry more recycled material decreasing the number of emissions released into the environment's atmosphere.

Although the embodiment houses the disclosed components drawn in FIG. 1, FIG. 2, FIG. 3, FIG. 4, FIG. 5, FIG. 6, FIG. 7, for the purpose of illustration, it is understood that such detail is solely for that purpose and variations can be made by those skilled in the art without departing from the teaching of this application. For example, the granulator housing 15 is illustrated in solid pieces but it is understood that the housing could be composed of several parts like its shredder counterpart 14.

Features described in the preceding description may be used in combinations other than the combinations explicitly described.

The forgoing specifications draw attention to those features of the invention believe to be of importance and the Applicant claims protection in respect of any patentable feature or combination of features hereinbefore referred to and/or shown in the drawings whether particular emphasis has been placed thereon.

The Term Compromising as used in the claim does not exclude other elements or steps. The term "a" or "an" as used in the claims does not exclude a plurality. A unit or other means may fulfill the functions of several units or means recited to the claims.

What is claimed is:

1. A reverse vending machine, said machine comprising of:
   a plastic transparent front face cover for housing the machine that allows a visual interpretation of the machine operation;
   a receptacle feeding cone that allows the user to scoop or place bottle and cans into a receptacle feeding cone structure to feed the machine bottle and cans in multiples instead of one at a time;
   a shredder to shred the bottles and cans when said bottles and cans are dropped from a conveyor into the shredder mouth;
   one or more rotating shredder blades that rotate simultaneously within the shredder housing to shred said bottles and cans to produce granulated material;
   a delivery system that catches the granulated material, said delivery system collecting the granulated material as the granulated material falls from the shredder and comprising a circular discharge wheel that rotates after collecting the granulated material to deliver the granulated material to one or more recycled materials receptacles;
   a color detector that detects the color of the granulated material produced from the bottles and cans placed into the machine for recycling;
   said one or more recycled materials receptacles store the granulated material based on color;
   one or more material waste screens of mesh design that screen large waste from being recycled with a material cleaning solution;
   one or more liquid waste sponges to absorb the material cleaning solution and filter waste.

2. The machine according to claim 1, wherein said receptacle feeding cone is a device with an attachment.

3. The machine according to claim 1, wherein said shredder blades are incurved sharpened all the way through with curved edge endings capable of shredding bottles and cans housed within the shredder.

* * * * *